(12) United States Patent
Ohta

(10) Patent No.: US 6,646,650 B2
(45) Date of Patent: Nov. 11, 2003

(54) IMAGE GENERATING APPARATUS AND IMAGE GENERATING PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 101 days.

(21) Appl. No.: 09/986,653

(22) Filed: Nov. 9, 2001

(65) Prior Publication Data

US 2003/0038816 A1 Feb. 27, 2003

(30) Foreign Application Priority Data

Aug. 22, 2001 (JP) ........................................ 2001-251592

(51) Int. Cl.⁷ ................................................. G09G 5/02
(52) U.S. Cl. ........................ 345/589; 345/592; 345/629; 345/620
(58) Field of Search ................................. 345/592, 589, 345/629, 620

(56) References Cited

U.S. PATENT DOCUMENTS

| | | | | |
|---|---|---|---|---|
| 5,347,620 A | * | 9/1994 | Zimmer | 345/592 |
| 5,475,507 A | * | 12/1995 | Suzuki et al. | 358/500 |
| 6,052,131 A | * | 4/2000 | Oka | 345/441 |
| 6,154,576 A | * | 11/2000 | Anderson et al. | 382/269 |
| 2002/0149599 A1 | * | 10/2002 | Dwyer et al. | 345/592 |
| 2002/0149626 A1 | * | 10/2002 | Ozcelik et al. | 345/781 |

* cited by examiner

Primary Examiner—Matthew C. Bella
Assistant Examiner—Mike Rahmjoo
(74) Attorney, Agent, or Firm—Nixon & Vanderhye P.C.

(57) ABSTRACT

An image generating apparatus and program capable of realistically displaying an image of a submerged land portion in consideration of water characteristics is provided. In rendering processing, when an object to be rendered is a water surface object, from color data (VR, VG, VB) of an object such as a land already written in the frame buffer, new color data (VR', VG', VB') is generated according to color parameters ($\alpha r$, $\alpha g$, $\alpha b$) predetermined based on the water characteristics. The color parameters are so determined that the ratio of reducing a red color component value VR becomes larger than the ratios of reducing a green color component value VG and a blue color component value VB ($\alpha r < \alpha g$, $\alpha b$). Then, by adding the color data (WR, WG, WB) of the water surface object and the new color data at a predetermined ratio with translucent processing, final color data (NR, NG, NB) is generated. Thus, an image realistically representing the submerged land portion can be generated.

7 Claims, 5 Drawing Sheets

IMAGE GENERATING APPARATUS AND IMAGE GENERATING PROGRAM

BACKGROUND OF THE INVENTION

1. Field of the Invention

The present invention relates to image generating apparatuses and image generating programs and, more specifically, to an image generating apparatus for generating an image representing a submerged land portion and others in a game world in virtual three-dimensional space, and an image generating program executed on the apparatus.

2. Description of the Background Art

Conventionally, a game machine, which is one example of computer-equipped image generating apparatuses, may display an image of a state of a land submerged in water when viewed from the water surface in a game world in virtual three-dimensional space.

Such image is generally generated by the following scheme. First, a land object formed by polygons is placed on a world coordinate system of virtual three-dimensional space. On a submerged area of the land object, a water surface object formed by polygons is placed. Next, the land object, the water surface object, and others are transformed into a camera coordinate system based on a virtual camera set outside the water surface, and subjected to clipping and hidden surface processing. Furthermore, a land texture pasted on each polygon of the land object and a water surface texture pasted on each polygon of the water surface object are respectively determined. Then, the textures corresponding to the respective polygons projected onto a virtual two-dimensional plane are rendered in the frame buffer based on a Z buffer or the like, thereby generating an image including a submerged land, for example ((a) of FIG. 6). Particularly in the submerged land portion in this image, an image is generated so that the land texture is translucently overlaid with the water surface texture.

However, in the above conventional scheme, the image of the submerged land portion is processed simply by a hardware's rendering function, and generated by combining each color data (R, G, B) of the land texture and the water surface texture at an equal ratio (for example, 30%:70%, or the like). That is, in the conventional scheme, the image of the submerged land portion is generated simply by mixing the color data of the water surface texture with the color data of the land texture. Therefore, one problem is that the image gives an impression totally different from that given when the submerged land or the like is viewed in the real world, lacking reality.

Also, to improve reality of the image, the land texture of the submerged portion of the land is prepared in advance separately from the land texture of the unsubmerged portions ((b) of FIG. 6). However, although preparation, in advance, of the land texture rendered with a different texture only for the submerged portion improves reality, the number of textures used in the game world is increased, thereby causing various problems such as complexity in texture generation at game development stage, and allocation of an area for storing the textures. Furthermore, another problem is that, in a case where such land texture as prepared in advance is used, when the water level is changed in the game world, for example, when the land portion first submerged in water then emerges above the water surface, a clear boundary line of the land texture appears ((c) of FIG. 6).

SUMMARY OF THE INVENTION

Therefore, an object of the present invention is to provide an image generating apparatus and an image generating program capable of generating an image realistically representing a submerged object (land portion or others) by changing a land texture in each color data at a predetermined ratio in consideration of water characteristics, and combining the land texture in a water surface texture.

The present invention has the following features to attain the object above.

A first aspect of the present invention is directed to an image generating apparatus that generates, in a frame buffer, an image representing an object placed in water as viewed from a water surface in virtual space. The apparatus includes image storage means (correspondence with the embodiment: memory 13, for example), first rendering means (main processor 11 and/or coprocessor 12, for example), color information reading means (main processor 11 and/or coprocessor 12, for example), color information changing means (main processor 11 and/or coprocessor 12, for example), color information generating means (main processor 11 and/or coprocessor 12, for example), and second rendering means (main processor 11 and/or coprocessor 12, for example).

The image storage means stores a water surface image for representing the water surface, and an object image for representing an object existing in the virtual space. The first rendering means renders, in the frame buffer, the object image read from the image storage means. The color information reading means reads, from the frame buffer, pixel-by-pixel color information (for example, VR, VG, VB, of RGB color components) of the object image corresponding to an area where the water surface image is rendered. The color information changing means reduces color component values included in the pixel-by-pixel color information read from the color information reading means so that a ratio of reducing a red color component value (VR) becomes larger than a ratio of reducing a blue color component value (VB) and a ratio of reducing a green color component value (VG). The color information generating means generates new pixel-by-pixel color information (NR, NG, NB) by mixing the pixel-by-pixel color information with each of the color component values reduced (VR', VG', VB') and pixel-by-pixel color information of the water surface image (WR, WG, WB) at a predetermined ratio $((1-\beta):\beta)$ with translucent processing. The second rendering means re-renders in the frame buffer the new pixel-by-pixel color information generated in the color information generating means.

As described above, in the first aspect, an object image providing a base such as a land is so processed in advance before translucently overlaid with a water surface image as that the red color component value included in the color data of the object image of a portion overlaid with the water surface image is reduced at a ratio larger than that used for the other color component values. Thus, the object image such as a submerged land translucently overlaid with the water surface image can be displayed more realistically than ever.

Here, preferably, the color information changing means changes at least the ratio of reducing the red color component value according to transmittancy and/or reflectivity of water in the virtual space. Alternatively, the color information changing means changes at least the ratio of reducing the red color component value according to a depth from the water surface to the object in water in the virtual space.

As such, the ratio of reducing the red color component value is changed according to the transmittancy and/or reflectivity of water, the depth from the water surface to the object, or others, thereby enabling realistic display according to the state of water in virtual space. Specifically, if the change is made according to the depth, the red color component can be made smaller for the texture of a land located at a position deeper from the water surface. Therefore, more realistic display can be made.

Also, preferably, parameter storage means (memory 13, for example) is further provided for storing a blue color parameter ($\alpha b$) according to the ratio of reducing the blue color component value, a green color parameter ($\alpha g$) according to the ratio of reducing the green color component value, and a red color parameter ($\alpha r$) according to the ratio of reducing the red color component value, the red color parameter smaller than the blue color and green color parameters, and the color information changing means multiplies the blue color component value by the blue color parameter, the green color component value by the green color parameter, and the red color component value by the red color parameter for reducing each of the color component values.

As such, by storing in advance parameters according to the ratios of reducing the respective color component values, the respective color component values are easily changed according to various states in virtual space.

A second aspect of the present invention is directed to an image generating program for making a computer (structured by main processor 11, coprocessor 12, memory 13, and others, for example) execute a procedure of generating, in a frame buffer, an image representing an object placed in water as viewed from a water surface in virtual space, the program making the computer execute a first image rendering step (S60, S61, for example), a color information reading step (S55, for example), a color information reducing step (S56, for example), color information generating step (S57, S58, for example), and a second image rendering step (S59, for example).

In the first image rendering step, an object image for representing an object existing in the virtual space is rendered in the frame buffer. In the color information reading step, pixel-by-pixel color information (VR, VG, VB) of the object image corresponding to an area where a water surface image for representing the water surface is rendered is read from the frame buffer. In the color information reducing step, color component values included in the read pixel-by-pixel color information is reduced so that a ratio of reducing a red color component value (VR) becomes larger than a ratio of reducing a blue color component value (VB) and a ratio of reducing a green color component value (VG). In the color information generating step, new pixel-by-pixel color information (NR, NG, NB) is generated by mixing the pixel-by-pixel color information with each of the color component values reduced (VR', VG', VB') and pixel-by-pixel color information of the water surface image (WR, WG, WB) at a predetermined ratio (($1-\beta$):$\beta$) with translucent processing. In a second rendering step, the generated new pixel-by-pixel color information is re-rendered in the frame buffer.

Here, preferably, the color information reducing step changes at least the ratio of reducing the red color component value according to transmittancy and/or reflectivity of water in the virtual space. Alternatively, the color information reducing step changes at least the ratio of reducing the red color component value according to a depth from the water surface to the object in water in the virtual space.

By introducing such image generating program into the computer for execution, it is possible to realize the image generating apparatus in the first aspect achieving the above effects.

These and other objects, features, aspects and advantages of the present invention will become more apparent from the following detailed description of the present invention when taken in conjunction with the accompanying drawings.

DESCRIPTION OF THE PREFERRED EMBODIMENTS

The image generating apparatus provided by the present invention is used in a graphic system, a game machine, and others that require image display by polygons and, in cooperation with a CPU, memory, and others composing these, realized by performing particular processing. With reference to FIG. 1 to FIG. 5, described below are the image generating apparatus and an image generating program executed on the apparatus, both provided by the present invention.

(System Environment for Realizing the Present Invention)

Figure 1:
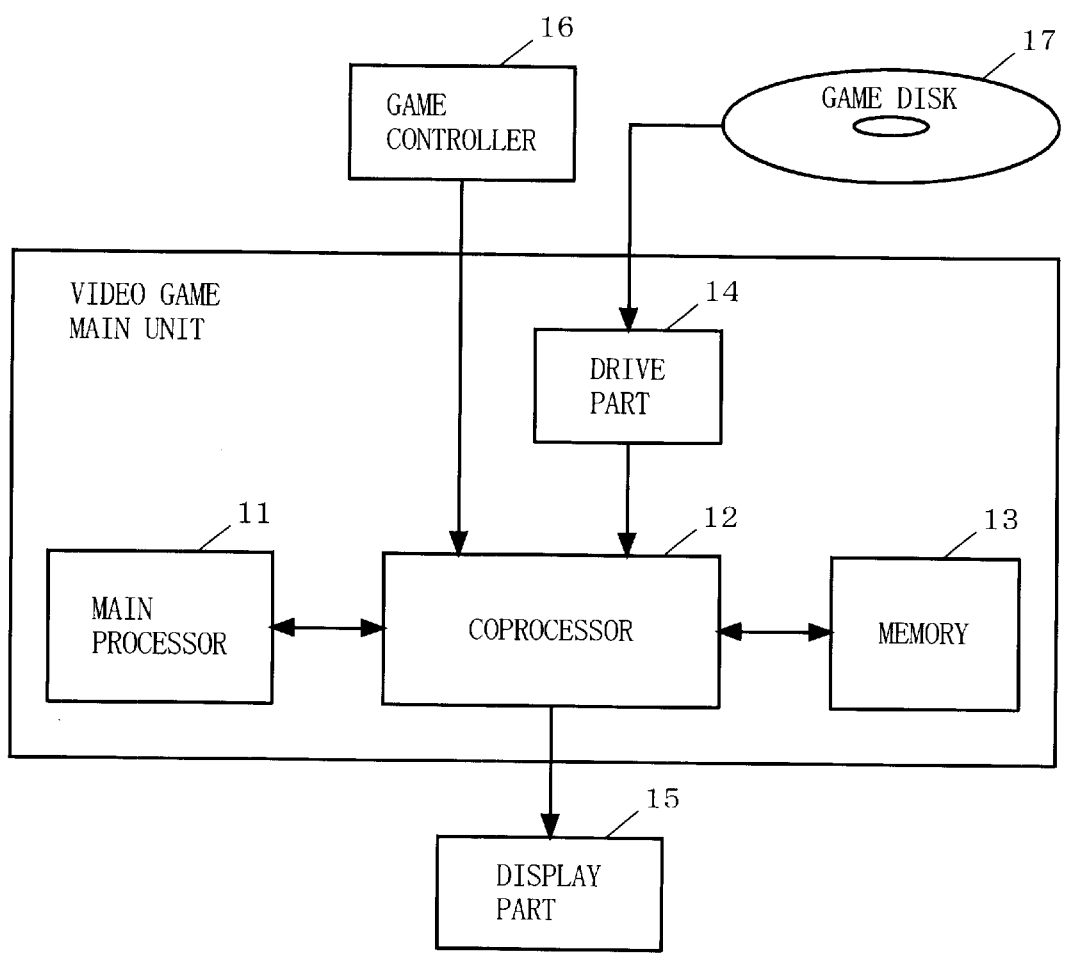
FIG. 1 is a block diagram showing one example of structure of a video game system including an image generating apparatus according to one embodiment of the present invention.
Figure 2:
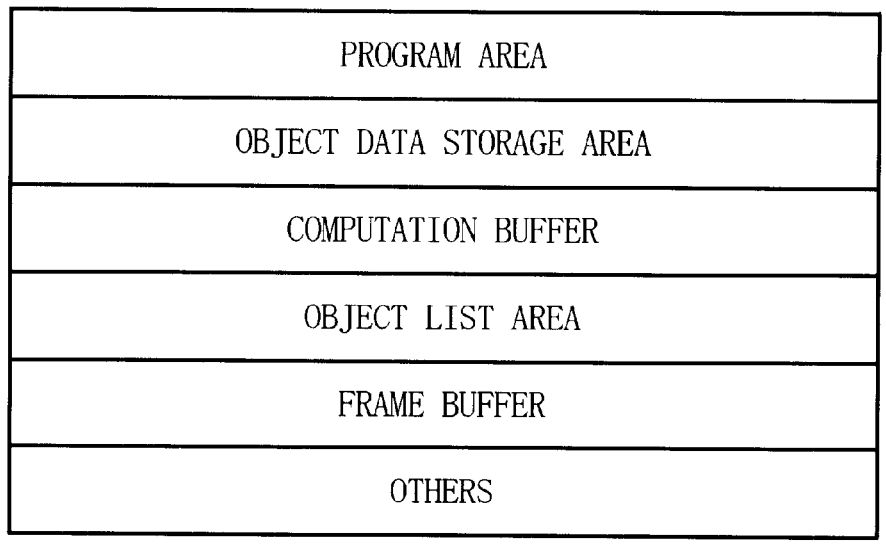
FIG. 2 is a diagram showing one example of a memory map of memory 13 in FIG. 1.
Figure 3:
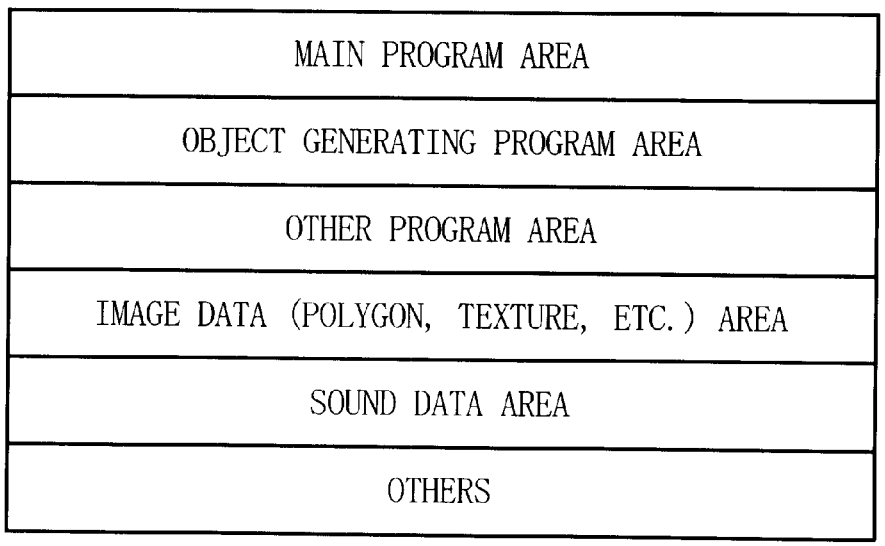
FIG. 3 is a diagram showing one example of a memory map of a game disk 17 in FIG. 1.

FIG. 1 shows an example of structure of a video game system including an image generating apparatus according to one embodiment of the present invention. In FIG. 1, the video game system is structured by a main unit including a main processor 11, a coprocessor 12, memory 13, and a drive part 14; a game controller 16; a display part 15; and a game disk 17. Thus, the image generating apparatus of the present embodiment is basically structured by the main processor 11, the coprocessor 12, and the memory 13.

The coprocessor 12 includes a bus control circuit for carrying out bus control, a signal processor for carrying out polygon coordinate transform, shading, and other processing, and a rendering processor for rasterizing polygon data on an image to be displayed and transforming the rasterized data into data format (dot data) storable in frame memory (any of them not shown) To the coprocessor 12, the drive unit 14 driving the game disk 17, and the memory 13 are connected. Also, to the coprocessor 12, the display part 15 is connected via a digital/analog converter (not shown) for outputting an audio signal and a video signal based on the data processed by the main processor 11. Also, to the coprocessor 12, the game controller 16 is connected.

The bus control circuit converts a command given by the main processor 11 through a bus as a parallel signal into a serial signal, and then supplies it to the game controller 16. Also, the bus control circuit converts a command given by the game controller 16 as a serial signal into a parallel signal, and then supplies it to the main processor 11. The data representing the state of operation supplied by the game controller 16 is subjected to processing, such as being processed by the main processor 11 or temporarily stored in the memory 13. The program stored in the game disk 17 and the program stored in the memory 13 are executed, on the main processor 11 and the coprocessor 12 in response to an operation supplied by the game controller 16. The coprocessor 12 makes the execution result displayed on a screen of the display part 15.

In FIG. 1, the image generating program executed on the image generating apparatus of the present invention is stored in the memory 13 and the game disk 17, and executed on the coprocessor 12. The memory 13 stores programs and data shown in a memory map of FIG. 2. The game disk 17 is a recording medium such as a DVD, and stores programs and data shown in a memory map in FIG. 3.

In the memory 13, a program area stores a basic system program for operating the video game main unit, and also a land object generating program and a water surface object generating program read from the game disk 17 and others. An object data storage part area stores image data of respective objects read from the game disk 17. A computation buffer is a buffer for use in computing each color data for the texture of the object. An object list area stores information of the objects required for composing a single frame image. A frame buffer stores the single frame's image.

In the game disk 17, a main program area stores a basic program for operating the game. An object generating program area stores image generating programs including the land object generating program, the water surface object generating program, and others. An other program area stores programs other than the main program and the object generating program. An image data area stores various data related to the land objects and the water surface objects (polygons, textures, and others required for game graphic display). A sound data area stores various data related to game sound representations.

(Execution Procedure of the Image Generating Program)

Further referring to FIG. 4 and FIG. 5, described next are, in the video game system shown in FIG. 1, how the image generating program is executed by the image generating apparatus and how the generated image is displayed on the screen of the display.

Figure 4:
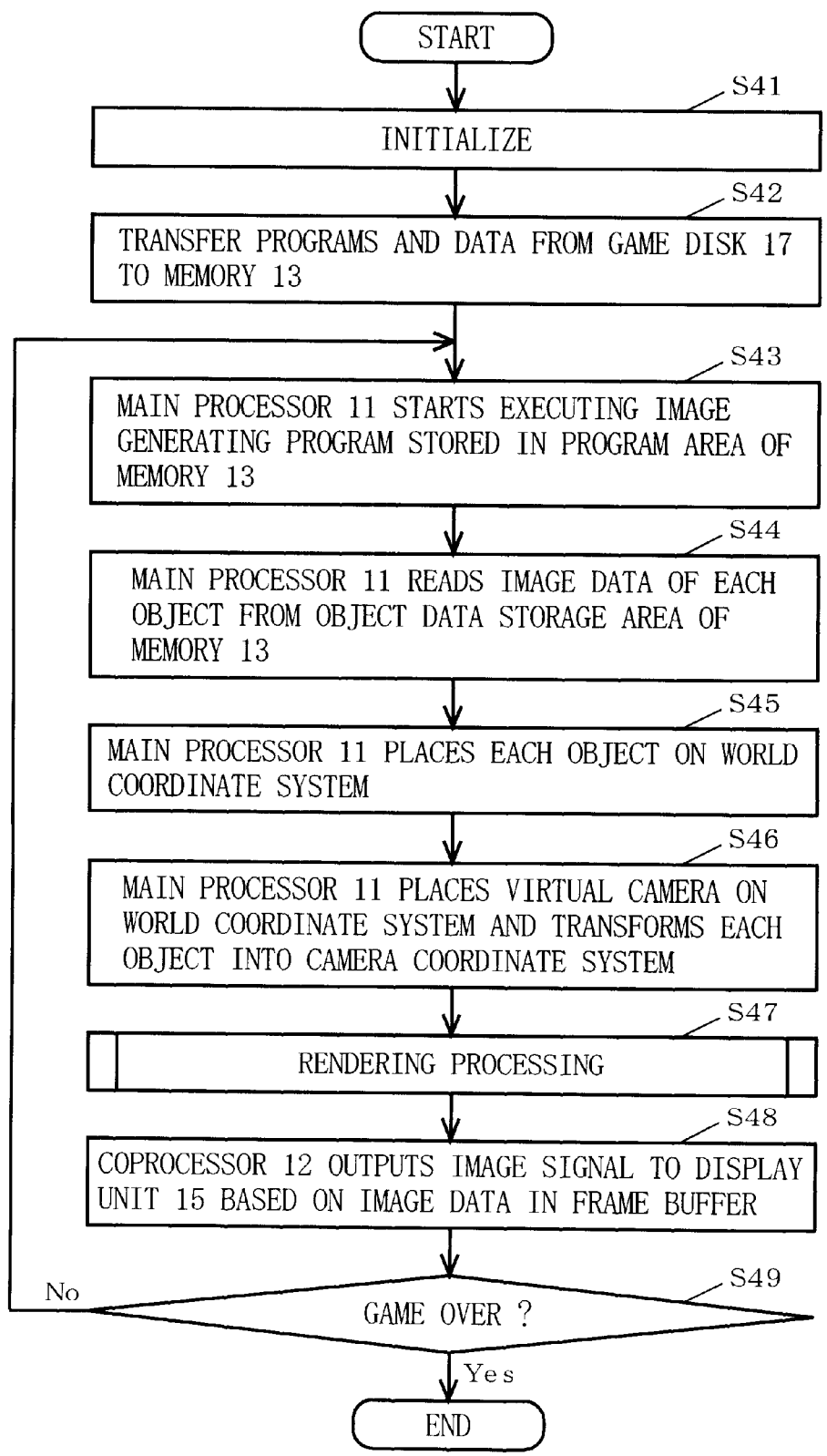
FIG. 4 is a flowchart for demonstrating the procedure of executing an image generating program on the image generating apparatus according to the embodiment of the present invention.

FIG. 4 is a flowchart for demonstrating the procedure of executing the image generating program on the image generating apparatus according to the embodiment of the present invention. FIG. 5 is a flowchart for demonstrating the detailed procedure of step S47 of FIG. 4.

With reference to FIG. 4, initialization is first carried out by a program that operates at the time of power on (step S41). In this initialization, whether the game disk 17 is set or not, whether the game controller 16 is connected or not, and others are detected. When initialization is completed, required programs and data are transferred from the game disk 17 to the memory 13 (step S42). Next, the main processor 11 starts executing the image generating program stored in the program area of the memory 13 (step S43). From the object data storage area of the memory 13, data for the objects (land object, water surface object, character, and others) is read (step S44). Then, the main processor 11 places each of the read objects on a world coordinate system (step S45). Then, the main processor 11 places a virtual camera corresponding to a viewpoint of a game player on the world coordinate system and, based on this virtual camera, transforms each object into a camera coordinate system (step S46). This transformation is realized by matrix transformation and two-dimensional coordinate transformation on the memory coordinates. Next, the coprocessor 12 carries out rendering processing on each object transformed into the camera coordinate system, and writes image data of each object into the frame buffer (step S47).

Figure 5:
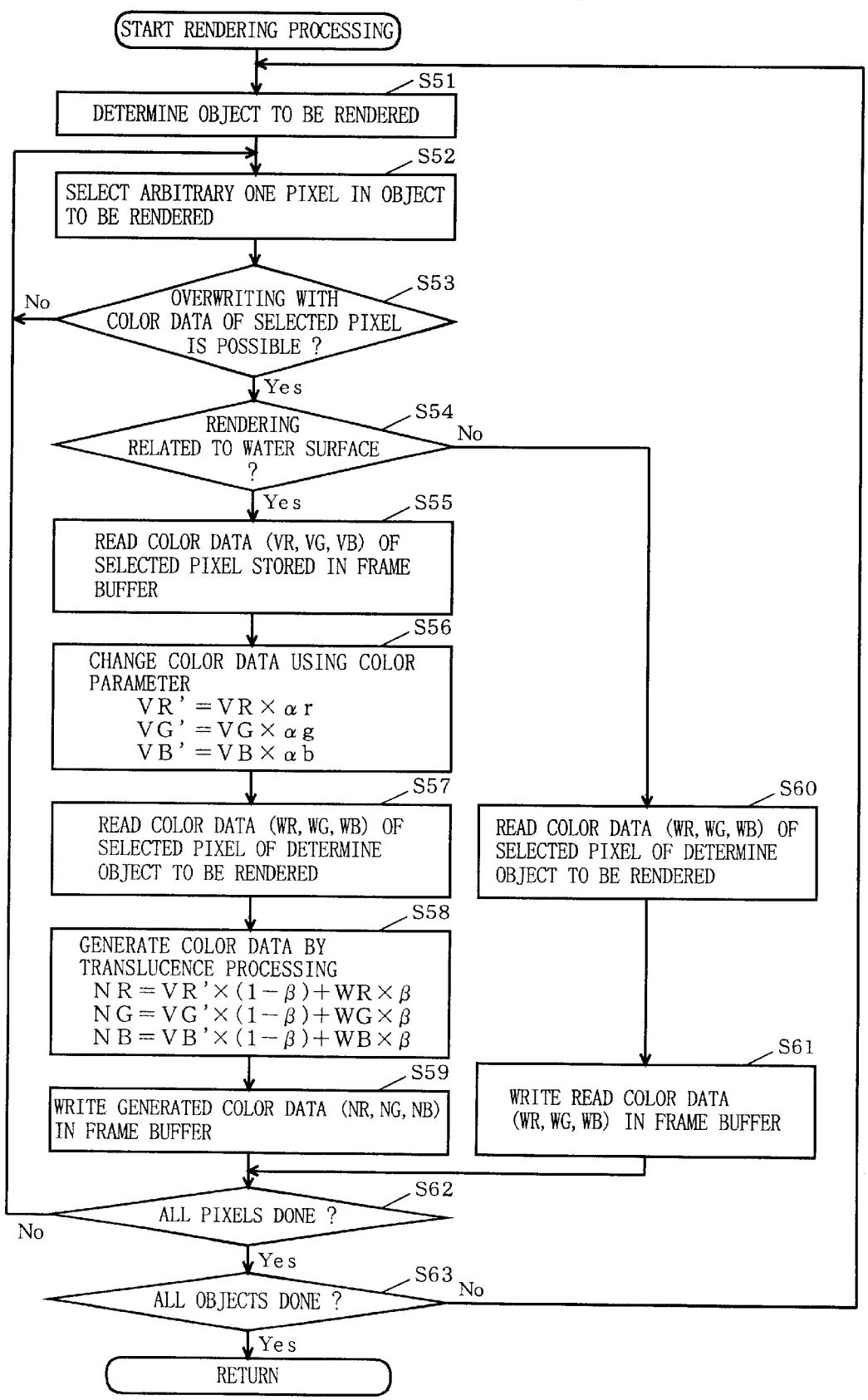
FIG. 5 is a flowchart for demonstrating the detailed procedure of step S47 of FIG. 4.
Figure 6:
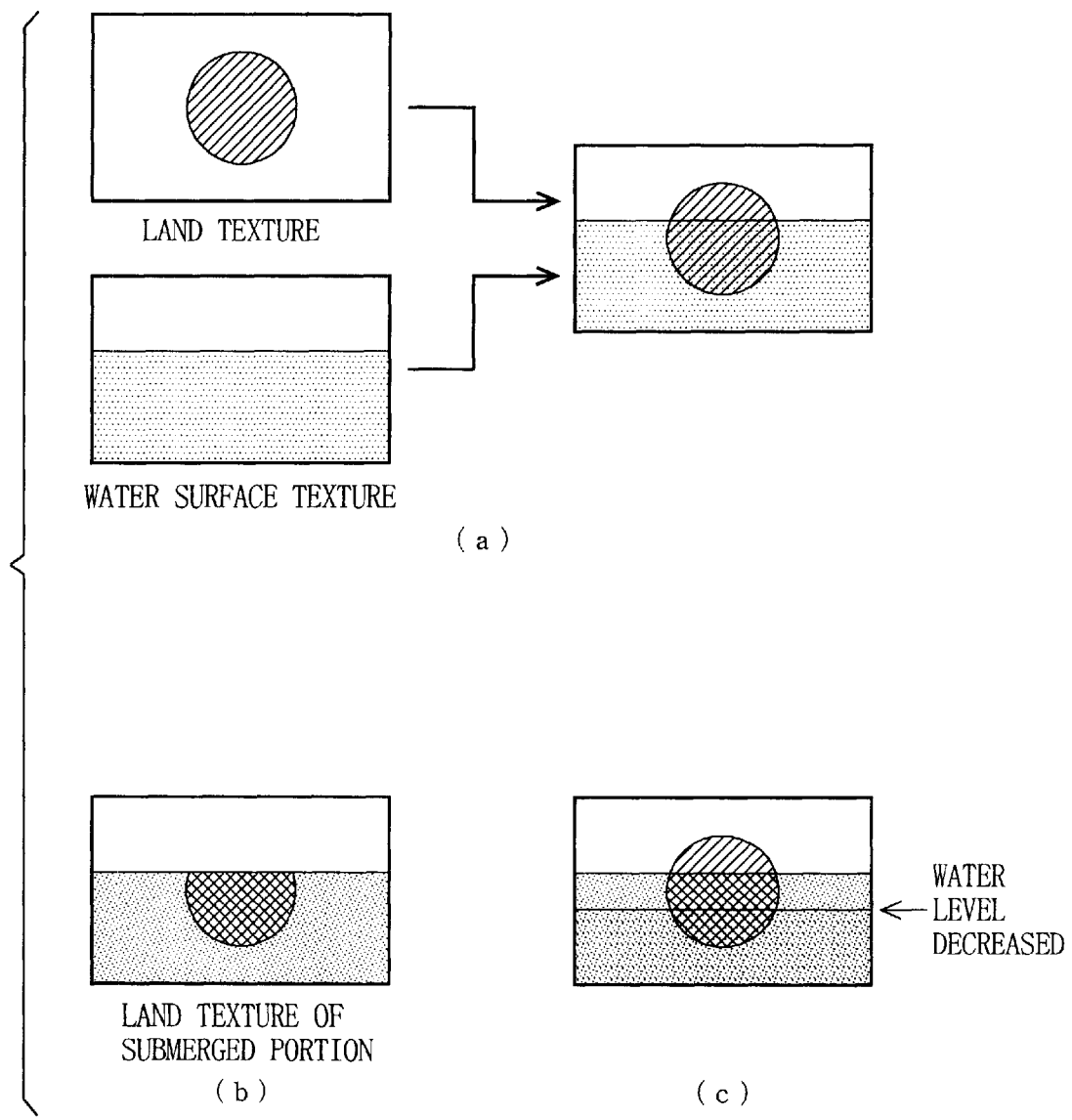
FIG. 6 is an illustration for demonstrating a concept of conventional processing of combining a land object image and a water surface object image.

Here, with reference to FIG. 5, described in detail is the rendering processing carried out in the above step S47.

The coprocessor 12 determines, from a plurality of objects, an object to be rendered (step S51). Next, the coprocessor 12 selects, from pixels composing the object determined as to be rendered, arbitrary one pixel for the rendering processing (step S52), and determines whether or not the existing color data can be overwritten with texture's color data of this pixel (step S53). This determination of whether overwriting is possible or not is made depending on whether, at the selected pixel position, the object to be rendered is located more close to the virtual camera side than the object already written in the frame buffer by any previous rendering processing.

If overwriting is determined impossible (step S53, No), the coprocessor 12 selects another pixel from the object to be rendered, and determines again whether overwriting is possible or not. On the other hand, if overwriting is determined possible (step S53, Yes), the coprocessor 12 determines whether the pixel belongs to a rendered portion related to a water surface or not, that is, whether the object determined in step S51 is a water surface object or any other object (step S54).

If the pixel belongs to the rendered portion other than the water surface (step S54, No), the coprocessor 12 reads from the memory 13 the texture's color data (red color component value; WR, green color component value; WG, blue color component value; WB) of the pixel of the object to be rendered (step S60), and writes the read color data into the frame buffer as color data (red color component value; VR, green color component value; VG, blue color component value; VB) (step S61).

On the other hand, if the pixel belongs to the rendered portion of the water surface (step S54, Yes), the coprocessor 12 reads from the memory 13 the texture's color data (VR, VG, VB) of the pixel already written in the frame buffer (step S55). Then, the coprocessor 12 uses color parameters ($\alpha r$, $\alpha g$, $\alpha b$) set in advance based on the water characteristics to change the read color data as in the following for carrying out processing of computing new color data (red color component value; VR', green color component value; VG', blue color component value; VB') (step S56).

$$VR' = VR \times \alpha r$$

$$VG' = VG \times \alpha g$$

$$VB' = VB \times \alpha b$$

where $0 \leq \alpha r, \alpha g, \alpha b \leq 1$

At this time, focusing attention on that color of actual land (land without water) looks as if its color is greatly reduced only in red color component when the land submerged in water is viewed from the water surface, the color parameters are so set that a ratio of reducing the red color component value VR is larger than ratios of reducing the green color component value VG and the blue color component value VB ($\alpha r < \alpha g, \alpha b$). For example, $\alpha r = 0.1$, $\alpha g = 0.4$, $\alpha b = 0.7$.

Note that the texture's color data may be changed uniformly by using a single color parameter, or may be changed differently by using color parameters set for the respective objects or respective environmental conditions (depending on distinction such as morning/day/night, for example) according to the transmittancy and/or reflectivity, etc. of water.

Also, a step may be provided before the process of step S56 for obtaining the depth from the water surface to the object in water by using Z buffer data and, depending on the obtained depth, the color parameter by which the color data is multiplied may be dynamically changed. For example, taking into consideration that as the depth of water is larger, sunlight is more difficult to reach to the bottom, the color parameter is so changed that the red color component becomes lesser for the texture of the land located deeper from the water surface. With this, the image more analogous to that seen in the real world can be represented with more reality.

Next, the coprocessor 12 reads from the memory 13 the texture's color data (WR, WG, WB) of the pixel of the water surface object to be rendered (step S57). The coprocessor 12 then carries out translucence processing for adding, at a predetermined ratio, the read color data (WR, WG, WB) and the new color data (VR', VG', VB') obtained by using the color parameters to generate final color data (red color component value; NR, green color component value; NG, blue color component value; NB), as shown in the following equations (step S58).

$$NR=VR'\times(1-\beta)+WR\times\beta$$

$$NG=VG'\times(1-\beta)+WG\times\beta$$

$$NB=VB'\times(1-\beta)+WB\times\beta$$

where $0<\beta<1$

The coprocessor 12 then writes the generated final color data (NR, NG, NB) into the frame buffer as color data (VR, VG, VB) (step S59).

The rendering processing in the above steps S52 to S61 is repeated for all pixels composing the object to be rendered (step S62) and for all objects to be rendered in one frame (step S63).

Note that, as described above, the rendering processing related to the water surface (steps S55 to S59) is carried out by a unit of pixel. Therefore, this processing is carried out on not only an entirely-submerged object but also a submerged portion of a partly-submerged object.

Referring back to FIG. 4, when the rendering processing is completed for all objects, the coprocessor 12 outputs an image signal to the display part 15 based on the image data written in the frame buffer (step S48). The processing in the above steps S43 to S48 is repeated until the game is over (step S49).

As stated above, in accordance with the image generating apparatus and the image generating program according to the embodiment of the present invention, an object image providing a base such as a land is so processed in advance before translucently overlaid with a water surface image as that the red color component values included in the color data of the object image of a portion overlaid with the water surface image is reduced at a ratio larger than that used for the other color component values.

Thus, the object image, such as a submerged land translucently overlaid with the water surface image, can be displayed more realistically than ever. Also, the ratio of reducing the red color component value is changed according to the transmittancy and/or reflectivity of water, the depth from the water surface to the object, or others, thereby enabling realistic display according to the state of water in virtual space.

Note that, the description has been made in the above embodiment for a case where the scheme provided by the present invention for generating an image representing a submerged land portion or the like is applied to image representation in virtual three-dimensional space. The scheme is also applicable to image representation in conventional virtual two-dimensional plane.

While the invention has been described in detail, the foregoing description is in all aspects illustrative and not restrictive. Needless to say, numerous other modifications and variations can be devised without departing from the scope of the invention.

What is claimed is:

1. An image generating apparatus that generates, in a frame buffer, an image representing an object placed in water as viewed from a water surface in virtual space, said apparatus comprising:

an image storage for storing a water surface image for representing the water surface, and an object image for representing an object existing in said virtual space;

a first renderer for rendering, in said frame buffer, said object image read from said image storage means;

a color information reader for reading, from said frame buffer, pixel-by-pixel color information of said object image corresponding to an area where said water surface image is rendered;

a color information changer for reducing color component values included in the pixel-by-pixel color information read from said color information reader so that a ratio of reducing a red color component value becomes larger than a ratio of reducing a blue color component value and a ratio of reducing a green color component value;

a color information generator for generating new pixel-by-pixel color information by mixing the pixel-by-pixel color information with each of said color component values reduced and pixel-by-pixel color information of said water surface image at a predetermined ratio with translucent processing; and a second renderer for re-rendering the new pixel-by-pixel color information generated in said color information generator in said frame buffer.

2. The image generating apparatus according to claim 1, wherein said color information changer changes at least the ratio of reducing said red color component value according to transmittance and/or reflectivity of water in said virtual space.

3. The image generating apparatus according to claim 1, wherein said color information changer changes at least the ratio of reducing said red color component value according to a depth from the water surface to the object in water in said virtual space.

4. The image generating apparatus according to claim 1, further comprising a parameter storage for storing a blue color parameter according to the ratio of reducing said blue color component value, a green color parameter according to the ratio of reducing said green color component value, and a red color parameter according to the ratio of reducing said red color component value, the red color parameter smaller than the blue color and green color parameters, wherein said color information changer multiples said blue color component value by said blue color parameter, said green color component value by said green color parameter, and said red color component value by the red color parameter for reducing each of the color component values.

5. An image generating program for making a computer execute a procedure of generating, in a frame buffer, an image representing an object placed in water as viewed from a water surface in virtual space, said program making said computer execute:

a first image rendering step of rendering, in said frame buffer, an object image for representing an object existing in said virtual space;

a color information reading step of reading, from said frame buffer, pixel-by-pixel color information of said object image corresponding to an area where a water surface image for representing the water surface is rendered;

a color information reducing step of reducing color component values included in said read pixel-by-pixel color information so that a ratio of reducing a red color component value becomes larger than a ratio of reducing a blue color component value and a ratio of reducing a green color component value;

a color information generating step of generating new pixel-by-pixel color information by mixing the pixel-by-pixel color information with each of said color component values reduced and pixel-by-pixel color information of said water surface image at a predetermined ratio with translucent processing; and a second rendering step of re-rendering said generated new pixel-by-pixel color information in said frame buffer.

6. The image generating program according to claim 5, wherein said color information reducing step changes at least the ratio of reducing said red color component value according to transmittancy and/or reflectivity of water in said virtual space.

7. The image generating program according to claim 5, wherein said color information reducing step changes at least the ratio of reducing said red color component value according to a depth from the water surface to the object in water in said virtual space.

* * * * *